Patented June 20, 1950

UNITED STATES PATENT OFFICE 2,511,838

THERAPEUTIC FUNGICIDAL COMPOSITION CONTAINING GENTIAN VIOLET

Clair E. Folsome, Plainfield, N. J., and Heron O. Singher, Red Hook, N. Y., assignors to Ortho Pharmaceutical Corporation, a corporation of New Jersey No Drawing. Application June 8, 1946, Serial No. 675,324

2 Claims. (Cl. 167—58)

This invention relates to novel compositions of matter and more particularly to novel topical medicaments and to methods for preparing the same. In its more specific aspect, the invention is directed to novel compositions of matter especially useful as topical medicaments for the control of mycotic vulvovaginitis.

Prior to this invention mycotic vulvovaginitis was treated by means of a gentian violet douche where a 1-2% aqueous solution of gentian violet was employed. This method of treatment with such a solution had a number of disadvantages among which are the following:

This solution is of pronounced heavy color, is easily spread and would run over parts of the body adjacent those portions being treated and in addition, got on the hands of the applicator, on the bathroom fixtures as well as on the clothing of the user even after application. These elements and parts became deeply stained, which stains persisted for a long period of time. In general, such method of application involved a very messy procedure and a time consuming task. Because of these disadvantages, some patients preferred swabbing of the affected parts with said solution by the physician at the physician's office. This method also was found to be unsatisfactory because it was time consuming from a clinician's viewpoint and in addition, even with this method, the patient was excessively and needlessly, but unavoidably stained on the unaffected parts of the body and embarrassed by the spotting of her clothing, after this type of application. Whether the douche or swab method was employed, clinical experience led the attending physician to favor such a 1-2% solution to obtaining a cure in a reasonable length of time. Ordinarily, the applications were made two or three times a week for a period of about one to three weeks. In the course of such treatment with such solutions, many women and especially blondes and diabetics developed chemical irritation of the parts treated with said solution.

This invention has been made in order to reduce if not completely eliminate many of the foregoing disadvantages present in the treatment of mycotic vulvovaginitis by douching or swabbing a 1-2% aqueous solution of gentian violet on the affected parts.

An object of this invention is to provide novel compositions especially suitable as effective topical medicaments especially useful in the treatment of mycotic vulvovaginitis which medicaments may be easily and readily applied in such a manner as to obviate offending the sensibilities of the average woman.

A further object of this invention is to provide novel topical medicament especially useful in the treatment of mycotic vulvovaginitis which medicament may be easily and readily self-administered.

A still further object of this invention is to provide novel topical medicaments for the treatment of vulvovaginitis with appreciable reduction and possible elimination of incidents of chemical irritation.

These as well as other objects and advantages of this invention will be readily apparent from the following description:

According to this invention there is provided a combination of a gel and gentian violet. The term "gentian violet" as employed in this description and claims is meant to include those products generally available in the market as "Gentian Violet." In the course of our experimentation, we have discovered effective topical medicaments could be produced by employing gentian violet in combination with an aqueous gel of one or a combination of two or more polysaccharic acids. These polysaccharic acids are normally solid and are capable of forming a gel with water. We prefer to employ pure water, and preferably de-ionized water in the practice of this invention. Examples of said polysaccharic acids, also known as polyuronic acids are pectin, algin, carrageen, fucoidin etc. These novel compositions which are gels at 70° F. may comprise a quantity of one of said polysaccharic acids, gentian violet and water, with the quantity of said polymer to said water being in the range of about 5 to 100 and about 12 to 100 and the quantity of said gentian violet to the sum of the quantities of said polymer and water being in the range of .04 to 100 and .5 to 100 and preferably .04 to 100 and .1 to 100.

A specific example of such a novel composition comprises the following components:

| | Parts by weight |
|---|---|
| Pectin powder | 6.5 |
| Gentian violet | .05 |
| Water | 93.45 |

Generally, we prefer to add to the aforesaid three component systems a quantity of a preservative and/or a quantity of a stiffening agent. Any of the well known preservatives for said gels may be employed, an example of which is propyl p-hydroxy benzoate. The stiffening agent which we prefer to employ is one or a combination of two or more cellulose ethers, examples of which are ethyl cellulose and methyl cellulose. Pectin is the polysaccharic acid preferably employed.

A specific example of a novel composition of this invention including both a preservative and a stiffening agent comprises the following components:

| | Parts by weight |
|---|---|
| Pectin powder | 6.5 |
| Gentian violet | .05 |
| Propyl p-hydroxy benzoate | .05 |
| Methyl cellulose | .075 |
| Water | 93.325 |

While the aforesaid various combinations are effective as topical medicaments in the treatment of mycotic vulvovaginitis, we have discovered that their effectiveness may be improved by adding thereto a quantity of surface tension depressant. While a great variety of surface tension depressants may be employed, we prefer to employ a surface tension depressant which also has the characteristic of itself being a fungicide and/or bactericide. The class of surface tension depressants which admirably serve this purpose are the quaternary ammonium salts and especially those having the following formula:

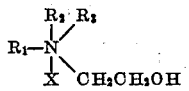

in which $R_1$ is a hydrocarbon radicle of at least 12 carbon atoms, $R_2$ and $R_3$ are hydrocarbon radicles of at least two carbon atoms and X is an hydroxyl group or an anion. Among some of the specific quaternary ammonium salts which are particularly suitable in the practice of this invention are those of the aforesaid formula in which $R_1$ is the cetyl group, $R_2$ and $R_3$ are ethyl propyl, butyl or amyl groups and X is a hydroxy or a halide.

By employing one of said quaternary ammonium salts in said combination, a synergistic action is obtained.

The following is a general example of a composition in which both the gentian violet and surface tension depressant are employed.

| | Parts by weight |
|---|---|
| Polysaccharic acid powder | 5 to 12 |
| Gentian violet | .04 to 0.1 |
| Surface tension depressant | 0.1 to 2.0 |
| Water | Sufficient to make up 100 parts by weight of the final product |

As in the other compositions, we prefer to employ a quantity of a stiffening agent and/or a quantity of a preservative.

The following is another specific example of a novel gel of this invention.

| | Parts by weight |
|---|---|
| Pectin powder | 6.5 |
| Gentian violet | .05 |
| Methyl cellulose | .75 |
| Propyl p-hydroxybenzoate | .05 |
| Cetyl diethyl B-hydroxyethyl ammonium chloride | .5 |
| Water | Sufficient to make up 100 parts by weight of final product |

These gels may be easily prepared by first dissolving the gentian violet in a portion of the water to be employed. Then this solution together with the remainder of the water is added to the desired quantity of powdered polysaccharic acid and the resulting mass is stirred and allowed to stand overnight. When the other components are to be used, they also are first dissolved separately in portions of the water and then all are added to the solid polysaccharic acid and allowed to stand overnight. The stirring operation as well as the standing overnight are preferably carried out under vacuum which may be as high as practical in plant operation. Immediately upon removing the vacuum, the gel is packaged in collapsible tubes in the usual manner.

All of the various compositions of this invention are gels having the following characteristics:

(a) They are effective topical medicaments and are especially useful in the treatment of mycotic vulvovaginitis.

(b) They may be readily expressed from a collapsible tube.

(c) They are of mucilaginous character so that they adhere to the parts being treated for a prolonged treatment period.

(d) They are tacky and will not flow out of the vagina.

(e) They are water miscible or dispersible so as to readily mix with the vaginal discharge and mucus of the vagina.

(f) They may be readily washed off of untreated parts if by chance they are accidently placed thereon.

(g) They are readily and easily spread so when deposited on affected parts, they will penetrate the folds and interstices thereof upon motion of the affected parts coated therewith.

(h) The aqueous gels of said polysaccharides are compatible with and do not inhibit the fungicidal action of either the gentian violet or the quaternary ammonium salts.

(i) The aqueous gels of said polysaccharides provide media in which said active ingredients, gentian violet and quaternary ammonium salts remain chemically stable.

We claim:

1. A therapeutic composition comprising an aqueous gel in which the active ingredients are gentian violet in an amount within the range of from 0.04 to 0.5% by weight and a quaternary ammonium salt of the formula

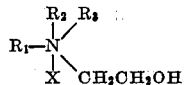

in which $R_1$ is a hydrocarbon radical of at least 12 carbon atoms, $R_2$ and $R_3$ are hydrocarbon radicals of at least two carbon atoms, and X is selected from the group consisting of hydroxyl and anion groups, in an amount within the range of from 0.1 to 2.0% by weight.

2. A therapeutic composition comprising an aqueous gel in which the active ingredients are gentian violet in an amount within the range of from 0.04 to 0.1% by weight and a quaternary ammonium salt of the formula

in which $R_1$ is a hydrocarbon radical of at least 12 carbon atoms, $R_2$ and $R_3$ are hydrocarbon radicals of at least two carbon atoms, and X is selected from the group consisting of hydroxyl and anion groups, in an amount within the range of from 0.1 to 2.0% by weight.

CLAIR E. FOLSOME.
HERON O. SINGHER.

(References on following page)

REFERENCES CITED

The following references are of record in the file of this patent:

UNITED STATES PATENTS

| Number | Name | Date |
|---|---|---|
| 1,219,291 | Gray | Mar. 13, 1917 |
| 2,087,132 | Taub | July 13, 1937 |
| 2,101,843 | Factor | Dec. 14, 1937 |
| 2,129,264 | Downing | Sept. 6, 1938 |
| 2,372,159 | Manchey et al. | Mar. 20, 1945 |

OTHER REFERENCES

Maclay et al.: Jour. Amer. Pharm. Assn. Sci. Ed., Apr. 1944, pages 113–116.

Sutton: Jour. of Amer. Med. Assn., vol. 110, No. 21, May 21, 1938, pages 1733–1837.

Bergy: Amer. J. of Pharm., Dec. 1939, pages 476–477.

Faley et al.: J. A. P. A., Apr. 1942, Sci. Ed., pages 105–108.

Redgrove: The Industrial Chemist, July 1937, pages 264–265.

Johnson et al.: Proc. Exptl. Biol. and Med., Nov. 1943, page 247.

Petroff et al.: The Quarterly Bull. of Sea View Hosp., July 1940, pages 372–384.

McBain et al.: J. Am. Chem. Soc., Oct. 1940, vol. 62, pages 2880, 2881.

Allen et al.: Amer. J. Obst. and Gynecol., Feb. 1943, pages 246–253.